Figures 1, 2:
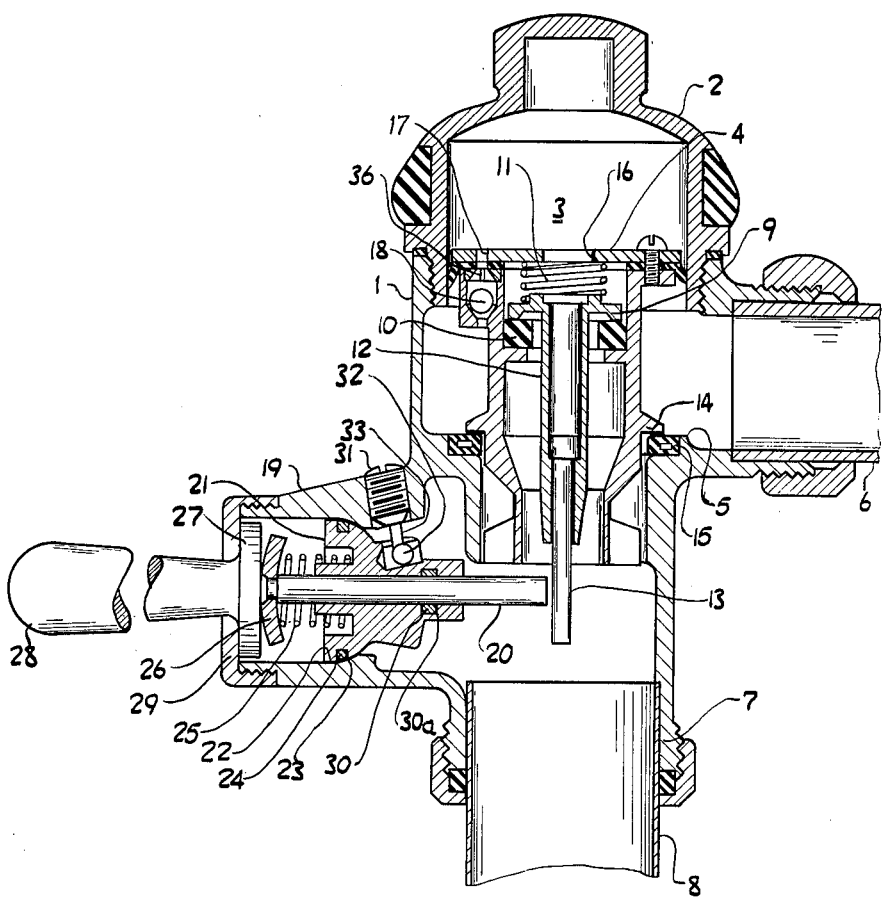

United States Patent Office 3,207,467
Patented Sept. 21, 1965

3,207,467
FLUSHING VALVES
Andreas Bühler, Krugersdorp, Transvaal, Republic of South Africa, assignor to Castle Brass Works (Proprietary) Limited, Krugersdorp, Transvaal, Republic of South Africa
Filed Aug. 5, 1963, Ser. No. 299,916
Claims priority, application Republic of South Africa, Aug. 16, 1962, 3,477/62
10 Claims. (Cl. 251—40)

This invention relates to flushing valves of the kind arranged to be connected directly to a water main and used extensively for water closets, urinals and the like.

A well known type of flushing valve for a liquid comprises; a cylindrical valve casing having a piston chamber and with an inlet on one side and an axial outlet; a hollow piston in said chamber carrying a main valve controlling the said outlet and housing a spring-seated relief valve controlling the passage of liquid from the upper side of the piston to the said outlet; by-pass means for enabling the pressure of the inlet liquid to leak to the upper side of the piston to close the main valve; and an actuating device including a handle for unseating the relief valve whereby the pressure on the upper side of the piston is liberated to the said outlet and thereby the inlet pressure, to cause the piston to rise and open the main valve, which remains open to deliver liquid or permit a flush for a period which depends upon the time taken for the pressure on the upper side of the piston to be re-established through the by-pass means and thereby to cause the return of the piston to close the main valve; the said relief valve has a stem provided with a telescopic extension and a spring-controlled plunger rod projecting into the valve casing in a transverse direction, is arranged to be moved axially by an exterior tiltably mounted handle to cause its inner end to engage such telescopic extension and deflect it, and consequently the relief valve, such that when the handle is held in its operative position the piston will rise until the lower end of the telescopic extension slides past the inner end of the plunger, thereby to become disengaged to permit the relief valve to close.

It will, accordingly, be understood that the length of this telescopic extension, with respect to the position of the plunger rod, will determine the maximum duration and extent of the flushing operation.

One known means for adjusting the effective length of the telescopic extension, consists in locating it within a screw-threaded sleeve arranged to be screwed into a tapped axial recess provided in the stem of the relief valve, and to secure such sleeve in adjusted positions by means of a locknut. While this method is effective, opening up of the valve casing is necessary to effect the adjustment.

An object of the invention is to provide simple exteriorly adjustable means for varying the maximum duration and extent of the flushing operation.

According to the invention, in flushing valves of the kind above described, the plunger rod is so mounted that its axis is capable of being tilted with respect to the axis of the telescopic extension of the stem of the relief valve, so that the point at which such telescopic extension is released from engagement with the inner end of the plunger rod, when the handle is held in its operative position, can be varied and consequently the distance which the piston will travel towards the closed end of its chamber before it reverses its direction of travel and commences to close, whereby the duration and extent of the flushing operation can be varied.

According to a preferred method of carrying out the invention, the plunger rod is slidably located in a mounting body which is tiltably mounted in a lateral extension of the valve casing, and wherein a screw-threaded adjusting element, rotatable from outside of the valve casing, and passing through it, is arranged to coact with the mounting body whereby, depending on the direction of rotation of the adjusting element, the mounting body can be tilted in either of two directions in a plane in line with the axis of the telescopic extension of the relief valve. The mounting body is conveniently mounted in a recess in the valve casing extension by means of a ball and socket joint arrangement and is resiliently held in its inwardly directed operative position by a compression spring which also biases the plunger rod toward its "off" position against the inner flanged end of the handle, which spring permits of the required tilting movement of the mounting body. The adjusting element is preferably in the form of a grub screw provided on its inner end with a spherical extension which engages inwardly of a slotted abutment provided on one side of the mounting body. A face on the mounting body inwardly of the slotted abutment provides a second abutment for the outer end of the spherical extension.

To enable the invention to be more clearly understood and carried into practice, reference is now made to the accompanying drawings in which:

FIGURE 1 is a part-sectional vertical elevation of a flushing valve incorporating the invention and FIGURE 2 is a fragmentary part-sectional view showing the arrangement of the adjusting element more clearly by being drawn to a larger scale.

Referring to the drawings, reference 1 denotes the cylindrical valve casing closed at its top end by a screw-on cap 2 which provides a piston chamber 3 in which a hollow piston 4 is slidably and sealingly located. The valve casing 1 has an inlet 5 on one side connectable to an inlet pipe 6, and an outlet 7 below the chamber 3, connectible to a flush pipe 8.

The piston 4 is provided interiorly with a relief valve 9 coacting with a seating 10, towards which it is biased by a compression spring 11. Slidably located in the hollow stem 12 of the relief valve 9 is a telescopic extension 13.

The lower part of the hollow piston 4 is provided with an annular flange 14 providing the main valve which coacts with a valve seating 15. The piston is provided with outlet opening 16 above the relief valve 9 and with a small bore by-pass passage 17 leading to the piston chamber 3, which passage is controlled in one direction by a ball valve 18.

The valve casing 1 is provided with a hollow lateral extension 19 in the bore of which the plunger rod 20 is located by passing slidably through a central bore in the mounting body 21, which is provided with an outer annular spherical face 22 which coacts with a corresponding annular spherical shoulder 23 provided in the bore of the casing extension 19. A sealing ring 24 located in an annular groove in the face 22, provides water-tight sealing of these two contact faces which are resiliently held in sealing contact by a compression spring 25, which presses the head 26 of the plunger rod 20 against the inner disc-shaped end 27 of the operating handle 28, which is held in the position shown by the holed screw-on cap 29.

To prevent leakage, a sealing ring 30 is located in an annular groove 30a in the bore of mounting body 21.

Limited tilting movement of the mounting body 21 in two opposite directions is effected by the grub-screw shaped adjusting element 31 which coacts with a tapped hole in the wall of the valve casing extension 19, which is suitably thickened as shown to receive it. The inner end of this adjusting element 31 is provided with a spherical shaped end extension 32 joined to such inner end by a neck part 33. The end extension 32 is rotatably located in a drilled hole 34 the outer wall portion of which is provided with a slot 35 in which the neck part 33 is a loose fit. The opposite wall portion of the hole 34 provides a second abutment for the outer end of the extension 32, so that rotation of the adjusting element 31 in one direction will cause the mounting body 21 to tilt in a downward direction, while rotation in the opposite direction, will cause the mounting body 21 to tilt in an upward direction.

As shown in FIGURE 1, the mounting body 21 is in its mid-position in which the plunger rod 20 projects at right angles to the telescopic extension 13.

A description will now be given of the operation of the device, it being assumed that the inlet pipe 6 is connected to a supply of water under pressure such as the mains. If now the handle 28 is operated by a tilting movement the disc-shaped end 27 will likewise be tilted, and this action will cause the plunger rod 20 to be projected inwardly against the action of the spring 25, so that its inner end makes contact with and deflects the telescopic extension 13 and consequently the relief valve 9, which, on thus being opened, permits liquid in the piston chamber 3 to drain out through the outlet opening 16 and down the flush pipe 8. Water pressure acting against the underside of the piston 4 will now cause the piston to move upwardly into the piston chamber 3 and in so doing will raise the main valve flange 14 off its seating 15 to allow the water to flow down the flush pipe 8.

At the same time, the telescopic extension 13 will be caused to slide upwardly against the inner end of the plunger rod 20 until it is disengaged therefrom, whereupon the relief valve 9 will be returned to its closed position under the influence of its spring 11.

The incoming water under pressure in the interior of the valve casing 1, will now cause some of it to pass slowly into the piston chamber 3 above the piston 4, by way of the by-pass passage 17. The ball valve 18 will not prevent this, due to the provision of a bleed groove 36 in the upper seating of such ball valve chamber. This restricted flow of water will cause the piston 4 to move downwardly until the main valve flange 14 again seats on its seating 15 and thus stops the flushing operation.

If plunger rod 20 is tilted upwardly by rotation of the adjusting element 31 in the appropriate direction, the piston 4 will have to travel further into the piston chamber 3 before the telescopic extension 13 becomes disengaged from the inner end of the plunger rod 20, and consequently will have to travel further in a downward direction before the main valve flange 14 is returned to its seating 15. Thus the duration of the flushing operation will be extended. Conversely if the plunger rod 20 is tilted in a downward direction the duration of the flushing operation will be shortened.

An advantage in controlling the restricted flow of liquid through the by-pass passage 17 by means of the ball valve 18, so that flow can only take place therethrough in an inward direction into the piston chamber 3, is that in the event of a failure of the pressure supply and the creation of a partial vacuum in the interior of the valve casing 1, the piston 4 will tend to be held against upward movement and consequent opening of the main valve, which otherwise might result in contaminated water being sucked back into the mains from say a lavatory pedestal to which the flush pipe 8 is connected. A further advantage is that this arrangement provides a self-clearing characteristic for the bleed groove 36, since any foreign matter which might tend to block it is washed out, due to movements of the ball valve 18 towards and away from its upper seating.

I claim:

1. A flushing valve for a liquid of the type comprising a cylindrical valve casing having a piston chamber and with an inlet on one side and an axial outlet; a hollow piston in said chamber carrying a main valve controlling the said outlet, said piston being subjected to the pressure in said inlet and arranged to bias said main valve to open position by the inlet pressure and housing a spring-seated relief valve controlling the passage of liquid from the upper side of the piston to the said outlet; by-pass means for enabling the pressure of the inlet liquid to leak to the upper side of the piston to close the main valve; and an actuating device including an exterior tiltably mounted handle for unseating the relief valve whereby the pressure on the upper side of the piston is liberated to the said outlet and thereby the inlet pressure causes the piston to rise and open the main valve, which remains open to deliver liquid or permit a flush for a period which depends upon the time taken for the pressure on the upper side of the piston to be reestablished through the bypass means and thereby to cause the return of the piston to close the main valve; wherein, the said relief valve has a stem provided with a telescopic extension and a spring-controlled plunger rod projecting into the valve casing in a transverse direction, is arranged to be moved axially by the exterior tiltably mounted handle to cause its inner end to engage such telescopic extension and deflect it and consequently the relief valve, such that when the handle is held in its operative position the piston will rise until the lower end of the telescopic extension slides past the inner end of the plunger, thereby to become disengaged to permit the relief valve to close, and means including a single adjustment screw means operable upon actuation from the exterior of the casing to directly effect the adjustment of the plunger rod to a selected position within a given range in which the plunger rod is tilted with respect to the axis of the telescopic extension, so that the point at which such telescopic extension is released from engagement with the inner end of the plunger rod when the handle is held in its operative position can be varied and consequently the distance which the piston will travel towards the closed end of its chamber, before it reverses its direction of travel and commences to close, whereby the duration and extent of the flushing operation can be varied.

2. A flushing valve as claimed in claim 1, wherein the plunger rod is slidably located in a mounting body which is tiltably mounted in a lateral extension of the valve casing, and wherein the adjustment screw means is rotatable from outside of the valve casing, passes through it, is arranged to coact with the mounting body whereby, depending upon the direction of rotation of the adjusting element, the mounting body can be tilted in either of two directions in a plane in line with the axis of the telescopic extension of the relief valve.

3. A flushing valve as claimed in claim 2, wherein the mounting body is mounted in a recess in the valve casing extension by means of a ball and socket joint arrangement and is resiliently held in its inwardly directed operative position by a compression spring which also biases the plunger rod towards an "off" position against an inner flanged end of the handle, which spring permits of the required tilting movement of the mounting body.

4. A flushing valve as claimed in claim 3, wherein the adjustment screw means is in the form of a grub-screw provided on its inner end with a spherical extension which engages inwardly of a slotted abutment provided on one side of the mounting body.

5. A flushing valve as claimed in claim 4, wherein a face on the mounting body inwardly of the slotted abutment, provides a second abutment for the outer end of the spherical extension.

6. A flushing valve as claimed in claim 5, wherein the two abutments with which the spherical extension of the adjustment screw means coacts comprise a hole in the inner end of the mounting body close to one side thereof so as to leave a web at such side, and a slot in such web of sufficient width to engage a neck portion of the adjusting element by means of which the spherical shaped end thereof is joined to its inner end, which slotted web provides one abutment, and wherein the opposite side of such hole provides the second abutment.

7. A flushing valve as claimed in claim 6, wherein the hole in the inner end of the mounting body has a diameter slightly greater than the diameter of the spherical shaped end of the adjusting element and the axis of such hole is oblique to the axis of the mounting body.

8. A flushing valve as claimed in claim 4, wherein the adjustment screw means engages with a tapped hole in a part of the lateral extension of the valve casing, which is locally thickened to receive it.

9. A flushing valve as claimed in claim 3, wherein the mounting body is provided with an outer annular spherical face which coacts with a similar inner annular spherical shoulder provided in the bore of the lateral extension of the valve casing, and wherein an annular groove is provided in the outer annular spherical face of the mounting body in which groove a sealing ring is fitted.

10. A flushing valve as claimed in claim 1, wherein the by-pass means comprises a restricted passage through the piston with which passage a non-return valve coacts in such a manner that flow of liquid can only take place in an inward direction into the piston chamber above the piston.

References Cited by the Examiner
UNITED STATES PATENTS

| | | | |
|---|---|---|---|
| 1,912,937 | 6/33 | George | 251—40 XR |
| 2,122,189 | 6/38 | Ward | 251—34 XR |
| 2,210,860 | 8/40 | Regnell | 251—42 XR |
| 2,838,946 | 3/56 | Filliung | 251—40 XR |

ISADOR WEIL, *Primary Examiner.*

WILLIAM F. O'DEA, *Examiner.*

UNITED STATES PATENT OFFICE
CERTIFICATE OF CORRECTION

Patent No. 3,207,467　　　　　　　　　　　　September 21, 196

Andreas Bühler

It is hereby certified that error appears in the above numbered patent requiring correction and that the said Letters Patent should read as corrected below.

Column 6, line 14, for "2,838,946" read -- 2,738,946 --.

Signed and sealed this 22nd day of February 1966.

(SEAL)
Attest:

ERNEST W. SWIDER
Attesting Officer

EDWARD J. BRENNER
Commissioner of Patents